United States Patent [19]

Cromley

[11] 4,213,379
[45] Jul. 22, 1980

[54] EMERGENCY VENTILATION SYSTEM FOR ENCLOSED LIVESTOCK CONFINEMENT STRUCTURES

[75] Inventor: Harold D. Cromley, Marshall, Mo.

[73] Assignee: Marshall Equipment Co. Inc., Marshall, Mo.

[21] Appl. No.: 886,035

[22] Filed: Mar. 13, 1978

[51] Int. Cl.² .................. F24F 13/00; A01K 31/00; E05F 15/20
[52] U.S. Cl. .................................. 98/33 R; 119/16; 49/31
[58] Field of Search .............. 98/33 R, 1.5; 236/49; 119/16; 137/568; 160/1; 49/141, 31; 91/400, 459; 92/130 C

[56] References Cited

U.S. PATENT DOCUMENTS

| | | | |
|---|---|---|---|
| 3,050,079 | 8/1962 | Tognella | 137/568 |
| 3,291,003 | 12/1966 | Lunenschloss et al. | 91/459 |
| 3,802,123 | 4/1974 | Frey et al. | 49/141 |
| 3,915,377 | 10/1975 | Sutton, Jr. | 236/49 |
| 3,951,336 | 4/1976 | Miller et al. | 98/1.5 |
| 4,056,048 | 11/1977 | Milroy | 98/41 R |
| 4,129,811 | 12/1978 | Pearson | 318/478 |

Primary Examiner—William E. Wayner
Assistant Examiner—Harry Tanner
Attorney, Agent, or Firm—Schmidt, Johnson, Hovey & Williams

[57] ABSTRACT

An emergency ventilation system especially adapted for use with an electrically-powered fan driven ventilation system in an enclosed livestock confinement structure includes solenoid actuated, hydraulically driven ventilation door control apparatus which is responsive to the presence or absence of the delivery of commercial electrical power service to the main ventilation system for automatically opening or closing one or more spring biased access doors in lower regions of the structure in order to assure ventilation of the structure at all times, even in the event of electrical power failures. A hydraulic cylinder assembly for shifting the position of each of the doors is operated by a hydraulic control system provided with a normally closed, solenoid operated valve which is electrically connected with the commercial power lines delivering power to the main ventilation system. Loss of commercial electrical power causes the valve to open whereupon the cylinder assembly is depressurized and the spring biased door is allowed to open. Resumption of power service results in closure of the valve and energization of a fluid pump to repressurize the cylinder assembly in order to close the door.

9 Claims, 3 Drawing Figures

EMERGENCY VENTILATION SYSTEM FOR ENCLOSED LIVESTOCK CONFINEMENT STRUCTURES

BACKGROUND AND BRIEF DESCRIPTION OF THE INVENTION

This invention generally deals with ventilation systems for buildings and pertains more particularly to apparatus for controlling the operation of ventilation doors to provide emergency building ventilation in the event of an electrical power failure.

The use of rather large, enclosed building structures especially adapted for maintaining animals in close confinement is a common practice in commercial livestock operations. In pig farrowing operations for example, it is normally desired to closely crowd the pigs within the enclosed structure so that a minimum of free space is available for the animals to roam about; in this manner, not only can a maximum number of animals be protectively enclosed from the outside elements within a limited area of floor space, but the animals are prevented from wasting fat energy through excess exercise and thus fatten more quickly than would otherwise occur if the floor space were less densely crowded. As a result of these close crowding conditions however, the air within the structure becomes quickly stale, and perhaps more importantly, the temperature within the structure, particularly at the floor level near the animals, quickly rises due to the substantial body heat given off by the animals. Young animals particularly pigs, are especially vulnerable to the adverse affects quickly brought on by stale air and excess temperature consequently, substantial ventilation systems are normally installed in these animal confinement structures to draw in fresh outside air from the atmosphere and expel the stale air from the structure to provide continuous, positive ventilation of the structure at all times.

Known ventilation systems presently in use typically employ electrically powered fan means for moving the air. In rural installations, electrical power outages are rather common, especially during the hot summer months when storms are often responsible for interrupting commercial power service. In some cases, emergency electrical power generators may be on hand to maintain power service to the ventilation fans when the commercial service is cut off, however the capital investment needed to provide backup power generation is substantial compared to the relatively short duration of time which this type of power is actually used. The need to provide constant ventilation in livestock confinement structures is absolutely critical, since, in the absence of adequate ventilation, the closely crowded animals may die from suffocation within a matter of minutes and an entire herd of livestock may be lost due to a temporary power failure. Apart from the use of a local emergency electrical power supply generator mentioned above, another possible means of protecting against suffocation of livestock is to provide a plurality of ventilation doors in the structure which are normally closed but which may be opened to create a ventilating draft which flows through the structure in the event of an electrical power lost. One way of implementing this last mentioned approach is to provide a signalling means remote from the confinement structure for alerting the farmer or other operating personnel that power to the ventilation fans has been lost, at which time the emergency ventilation doors may be manually opened. However, this last discussed approach has obvious disadvantages; for example, personnel must be available at all times to detect the loss of power service—this requirement is impractical where the livestock operation is run by a single individual. Moreover, in the case of especially large livestock operations involving several large confinement structures, considerable time might be required to manually open the multiplicity of ventilation doors which must be opened to provide adequate ventilation. It is not uncommon, especially in rural areas, for electrical service to be interrupted a number of times within a single day, consequently, the use of manually operated emergency ventilation doors as described above is also impractical for the reason that considerable time and effort must be devoted to effecting the opening and closing of the ventilation doors.

From the foregoing, it is apparent that there is a need in the art for an emergency ventilation system including means for simultaneously and automatically both opening or closing a plurality of ventilation doors in response to the presence or absence of commercial electrical power to the conventional ventilation system of the confinement structure.

According to the present invention, a novel emergency ventilation system including unique apparatus for operating a ventilation door includes means for sensing the presence or absence of commercial electrical power service and hydraulically operated power means responsive to the electrical power sensing means for selectively opening or closing an emergency ventilation door. A hydraulically operated bi-state cylinder assembly connected to the door functions to maintain the latter in a closed position under normal circumstances when commercial electrical power is being received, but releases the door to the influence of a spring biasing means which opens the door when the commercial electrical power is interrupted.

An important object of the present invention is to provide an emergency ventilation system for an enclosed livestock confinement structure which is automatically responsive in operation to the presence or absence of commercial electrical power to the structure. As a corollary to the foregoing object, it is a further object to provide means for sensing the absence of commercial electrical power to the structure and providing emergency ventilation of the structure in response to the absence of commercial electrical power.

Another object of the invention is to provide a novel control system for automatically opening and closing a ventilation door in response to the presence or absence of commercial electrical power to the confinement structure.

A further object of the invention is to provide a ventilation system of the type described in which a plurality of door control systems of the type mentioned are employed and are simultaneously operable to open and close the associated doors without the need for direct interconnection of the control systems to achieve the simultaneous operation thereof.

A still further object of the invention is to provide a control system of the mentioned type which is readily adpatable for use with the various types and sizes of ventilation doors.

Another object of the invention is to provide a ventilation system of the type mentioned above which functions to reverse the flow of ventilating air within the structure in response to the loss of electrical commercial power by creating an upwardly directed air draft which draws cool outside air into the structure in the lower regions of the latter and exhausts the warmer air within the structure through upper regions of the latter.

These and further objects of the invention will be made clear or become apparent in the course of the following description of a preferred embodiment of the invention.

DETAILED DESCRIPTION OF THE INVENTION

Figure 1:
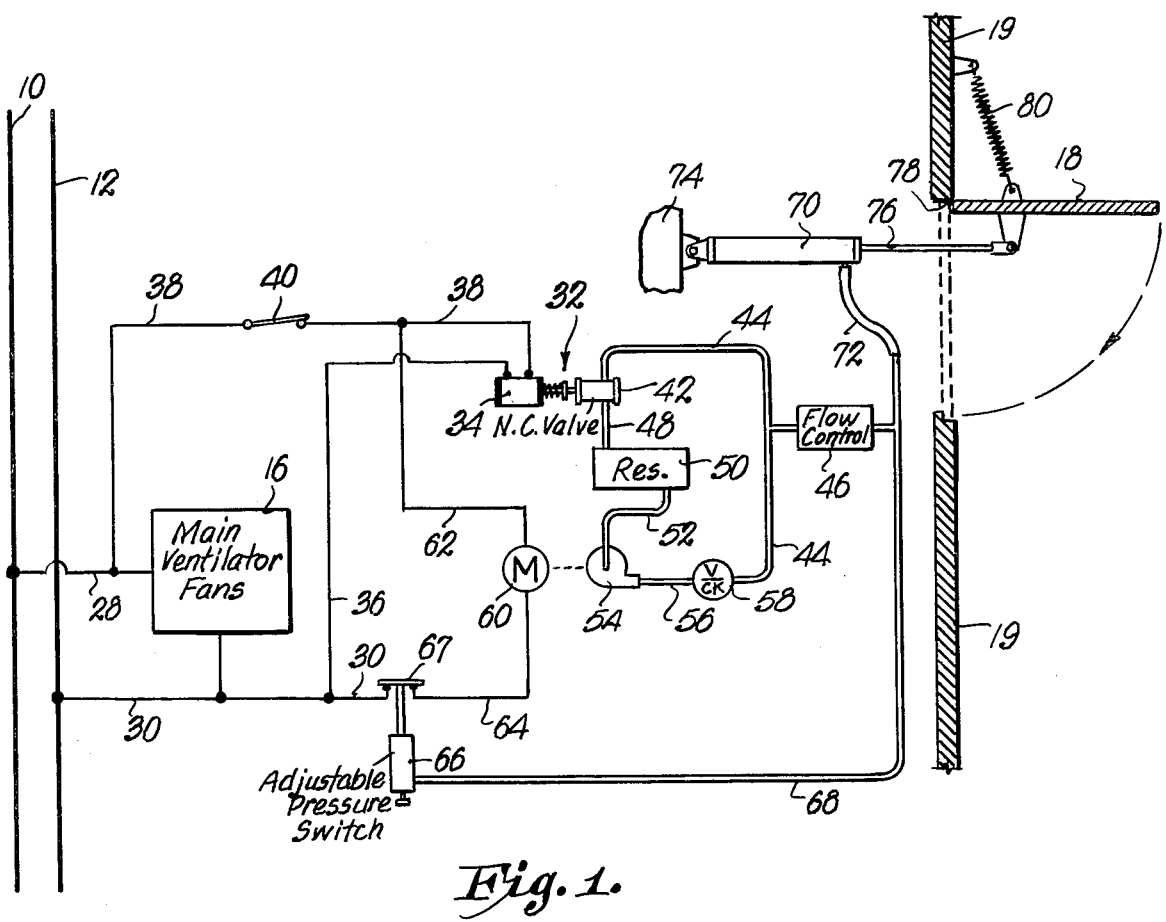
FIG. 1 is a combined schematic and diagramatic representation of a control system for providing emergency ventilation of a livestock confinement structure which forms the preferred embodiment of the invention, shown in operative relationship to a ventilation door in the structure and a set of electrical power lines for normally delivering commercial electrical power to the structure.
Figure 2:
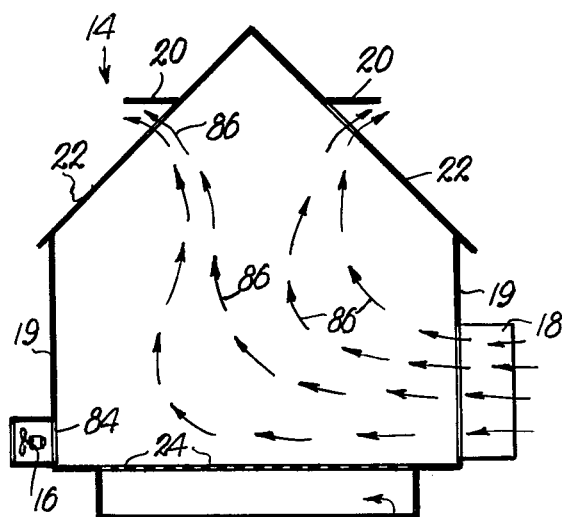
FIG. 2 is a diagramatic representation of a typical livestock confinement structure showing the path of ventilation air through the structure when commercial electrical power service has been interrupted.
Figure 3:
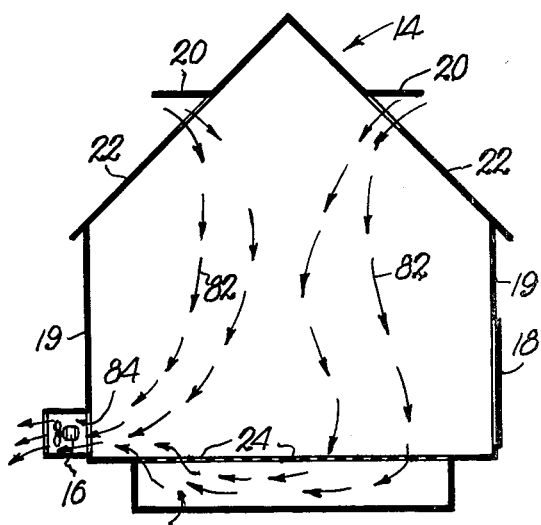
FIG. 3 is a view similar to FIG. 2 but showing the path of the ventilation air through the structure when commercial electrical power service is restored to the latter.

Referring now to the drawing, a pair of electrical power lines 10 and 12 respectively deliver electrical power from a commercial generating source (not shown) to a building such as the enclosed livestock confinement structure generally indicated by the numeral 14. The structure 14 includes one or more electrically energizeable main ventilation fans 16 disposed in the lower regions thereof and communicating with the air space inside and outside the structure 14. The structure 14 may assume any of various building configurations but will typically include one or more access doors 18 at ground level in the side walls 19 and a plurality of ventilation doors 20 in the upper regions thereof, typically disposed in the roof 22. The structure 14 may include a grated type floor 24 and a recessed area 26 thereunder for collection of animal wastes.

The ventilation fans 16 receive electrical power via the distribution lines 28 and 30 which are respectively connected to the power lines 10 and 12. A normally closed, solenoid operated valve 32 has the electrically responsive energizeable portions 34 thereof connected in parallel with the fans 16 across the power lines 10 and 12 by means of line 36, and by line 38 through the normally closed, single pole, single throw switch 40. The normally closed two-way valve portion 42 of valve 32 has one hydraulic input thereof coupled by hydraulic line 44 to the flow control device 46 while the other hydraulic input thereof is coupled of via hydraulic line 48 to the hydraulic fluid resevoir 50. Resevoir 50 is coupled via hydraulic line 52 to the hydraulic input of the hydraulic fluid pump 54 whose output is coupled by line 56 through check valve 58 to line 44 and thus to the flow control device 46. Pump 54 is driven by an electrical motor 60 whose electrical power inputs are respectively connected by lines 62 and 38 to power line 10, and by line 64 to one terminal of the hydraulically driven pressure switch 66, the other terminal of the latter being connected by distribution line 30 to power line 12.

A second input to the flow control device 46 is commonly coupled to the hydraulic input of pressure switch 66 via hydraulic line 68 and to the single input of the hydraulically operated cylinder member 70 via line 72. Cylinder member 70 is of the conventional type and has one end thereof pivotally secured to a stationary support 74, and includes an extendable rod member 76 whose outer extremity is pivotally attached to the interior side of access door 18, the door 18 being mounted on side wall 19 by means of the hinge 78 for outward swinging movement about an essentially upright axis. An ordinary compression type spring 80 has the opposite ends thereof respectively secured to the side wall 19 adjacent the hinge 78 and to the exterior face of door 18, such that the spring 80 normally urges the door 18 to swing outwardly to its open position.

In operation, the invention is cooperatively operable with the fans 16 and is responsive to the present or absence of electrical power delivered by the power lines 10 and 12 to selectively operate the doors 18 in a manner to assure automatic ventilation of the structure 14 at all times, even in the event of electrical power failures. Under normal conditions when power lines 10 and 12 are delivering commercial electrical power via distribution lines 28 and 30 to the main ventilator fans 16, the access doors 18 are closed and the fans 16 function to draw fresh outside air in through the vent doors 20 and down through the structure 14 through the recessed area 26, thereby expelling the stale air within the structure 14 and creating air flow paths as indicated by the arrows 82 which is directed out through the opening 84 and side walls 19 into the atmosphere. Thus, it is apparent that a positive flow of ventilating air is drawn in through the upper portions of the structure 14 down toward the lower regions thereof and expelled through the latter. In the event of a power failure or the like, in which case fans 16 are rendered inoperative, the opening 84 is insufficient in size to allow a substantial volume of air to be drawn in, by natural air currents, through the structure 14; consequently the access doors 18 are simultaneously opened to allow the substantial volumes of fresh outside air to enter into lower regions of the structure 14 in which case a warm air flow draft indicated by the arrows 86 is created between the openings normally covered by the access doors 18 and the open vent doors 20. The volume of fresh air drawn through the structure 14 is normally adequate to provide sufficient ventilation to prevent suffocation of livestock therewithin for an indefinite period of time.

Focusing attention more particularly now on FIG. 1, it can be appreciated that the access door 18 has been swung to its open ventilating position. Let it now be assumed that commercial electrical power is being delivered to the structure 14 via power lines 10 and 12 and that the switch 40 has been switched from an open to a closed position thereby coupling the electrical energizeable portion 34 of the solenoid operated valve 32 to the energizing power lines 10 and 12, whereupon the portion 34 is operative to switch the valve portions 42 from an open to a closed position whereby to prevent the flow of fluid from line 44 to line 48. At this point, the moveable contact 67 of the pressure switch 66 is electrically connecting lines 64 and 30 with each other, consequently the motor 60 is coupled across the power lines 10 and 12 and is therefore energized to drive the pump 54. With pump 54 energized, fluid derived from resevoir 50 is pumped from line 52 through line 56, check valve 58, line 44 through the flow control device 46 to both cylinder 70 via line 72, and pressure switch 66 by line 68. As the pressure within the forward chamber of cylinder 70 gradually increases, the piston member within the latter shifts to retract the rod 70 when the fluid pressure overcomes the influence of spring 80, consequently access door 18 swings inwardly toward the side walls 19 to its closed position. Pressure switch 66 is operative to sense the gradually increasing hydraulic pressure within the cylinder 70 and is responsive to a specific level of fluid pressure corresponding with the closing of access door 18, to shift the moveable contact 67 thereby breaking the circuit connection between lines 30 and 64 and uncoupling the power line 12 from the motor 60 to de-energize the latter. With motor 60 de-energized, pump 54 ceases to function and the pressure level of fluid within line 72 and cylinder 70 is maintained by virtue of the fact that valve portions 42 and check valve 58 prevent the flow of fluid in line 44 back to the resevoir 50. At this point, the access doors 18 are in their closed positions and the control portion of the invention is in a steady-state, stand-by condition while the main ventilator fans 16 provide ventilation of the structure 14 in the normal manner.

Let it now be assumed that an interruption in the power service on power lines 10 and 12 has occurred in which case the main ventilator fans 16 are de-energized and normal ventilation of the structure 14 is discontinued. Under these circumstances, the energizeable portion 34 of the solenoid operated valve 32 senses the loss of commercial power and is responsive to such condition to automatically switch to its de-energized state in turn switching the valve portions 42 from a normally closed position to an open position. With valve 42 open, fluid within the cylinder 70 as well as within lines 68 and 72 is allowed to flow back through flow control device 76 and line 44 through valve 42, thence through line 48 to the resevoir 50. As fluid escapes from the cylinder 70, the influence of spring 80 eventually exceeds that of cylinder 70 so that access doors 18 are swung outwardly to their open positions. Also, as the fluid pressure in line 68 drops to a prescribed level, the pressure switch 66 functions to bring the moveable contact 67 into communication with lines 30 and 64 thereby coupling the motor 60 across the power lines 10 and 12; of course, if a continued loss of commercial electrical power is experienced, motor 60 will fail to be energized at this point and the access doors 18 will remain in their open, ventilating positions. With the resumption of commercial electrical power on lines 10 and 12, the energizeable portion 34 of solenoid operated valve 32 is energized thereby switching the valve 42 back to its normally closed position, and the motor 60 is simultaneously energized since the moveable contact 67 has closed the circuit path between power lines 10 and 12, and the motor 60. The operation of the control system then proceeds in a manner similar to that previously described: pump 54 being energized, fluid is delivered under pressure through line 56, check valve 58, line 44, flow control device 46 to both the cylinder 70 by line 72 and pressure switch 66 by line 68. Eventually, the fluid pressure within cylinder 70 overcomes the biasing influence of spring 80 whereupon the access doors 18 swing to their closed positions, and shortly thereafter the pressure build-up in line 68 is sufficient to cause pressure switch 66 to shift the moveable contact 67 and thereby remove power from the motor 60.

From the foregoing description it can be readily appreciated that the access doors 18 are automatically opened and closed in response to the presence or absence of commercial electrical power on distribution lines 28 and 30 as derived from power lines 10 and 12. Consequently, the invention novelly cooperates with the conventional ventilation system of an enclosed livestock confinement structure in a manner to insure automatic ventilation of the structure even throughout the course of a plurality of successive commercial electrical power failures.

From the foregoing, it is clear that the invention provides especially effective means for providing emergency ventilation of an enclosed livestock confinement structure in a manner which is completely automatic, but yet which is especially reliable. Thus, it will be observed that the improved apparatus not only provided for the reliable accomplishment of the objects of the invention, but does so in a particularly simple and reliable manner. It is recognized, of course, that those skilled in the art may make various modifications or additions to the preferred embodiment chosen to illustrate the invention without departing from the gist and essence of this contribution to the art. Accordingly, it is to be understood that the protection sought and to be afforded hereby should be deemed to extend to the subject matter claimed and all equivalents thereof fairly within the scope of the invention.

Having thus described the invention, what is claimed as new and desired to be secured by Letters Patent is:

1. For use with an enclosed building having vented upper regions placing the interior of said building in airflow communication with the outside atmosphere and having normally closed access door means in the lower regions thereof, and of the type including normally energized, electrically driven fan means connected to an electrical power supply and coupled between said lower regions of said building and said outside atmosphere for normally drawing outside air into said building through said vented upper regions and down through the interior of said building for exhaust from the latter out through said lower regions, apparatus for automatically providing emergency ventilation of said building when electrical power service to said fan means is interrupted, including:

means for selectively operating said door means to allow cooler outside air to enter said building through said lower regions thereof whereby to create a warm air draft for forcing warm air within said lower regions upwardly for outside exhaust through said vented upper regions, said door operating means comprising— biasing means operably connected to said door means for urging the latter to shift from said closed position thereof toward an open position;

control means operably connected to said door means and to said electrical power supply for selectively opening and closing said door means, said control means normally releasably retaining said door means in said closed position thereof, said control means being actuated in response to interruption of electrical power service to said fan means to release said door means from its said closed position whereby to permit said biasing means to shift said door means to its said open position, said control means comprising a bistate, power-driven motor member having a shiftable output element coupled with said door means, and being actuatable to a first operating state for releasing said door means from its said closed position to allow shifting of said door means to its said open position under the influence of said biasing means, and being further actuatable to a second operating state for shifting said door means against the influence of said biasing means from its said open position to its said closed position, said motor member comprising a reciprocable piston device having a power input thereto adapted to receive a force transmitting flowable medium for driving said device, means operably coupled with said motor member for actuating the latter between said first and second operating states thereof, means operably coupled with said actuating means and said electrical power supply for detecting the flow of electrical power to said fan means, said actuating means being responsive to said detecting means to actuate said motor member between said first and second operating states thereof in accordance with said flow of electrical power detected by said detecting means, said actuating means including— pumping means thereof operably coupled with said piston device input and having an input thereof adapted to be coupled with a source of said flowable medium, said pumping means being operable for delivering a quantity of said flowable medium under pressure to said piston device whereby to drivingly energize the latter, electrical motor means adapted to be coupled with said electrical power supply and coupled with said pumping means for energizing the latter to deliver said medium to said piston device, means for sensing the pressure of said medium delivered by said pumping means to said piston device, said sensing means including switchable circuit means and being operably coupled with said piston device input and between said electrical motor means and said electrical power supply, said sensing means being operative to uncouple said electrical power supply from said electrical motor means whereby to de-energize said pumping means when a preselected level of pressure has been sensed, and actuatable valve means operably coupled with said piston device input and with said detecting means, and actuatable by the latter for selectively relieving medium pressure to said piston device input whereby to de-energize the latter.

2. For use in a building having electrical power service delivered thereto, apparatus for controlling a door or the like in accordance with the delivery of electrical power to said building, including:

motor means operably coupled with said door for shifting the latter between a first position and a second position, said motor means comprising a cylinder member having a power input thereto, and including a shiftable output element connected to said door;

biasing means operably coupled with said door for shifting the latter toward its said second position;

an intermediate power source operably coupled between said electrical power service delivered to said building and said motor means, for selectively energizing the latter for shifting of said door, said intermediate power source including pumping means adapted to be coupled with a source of a force transmitting medium for delivering a quantity of said medium under pressure to said power input of said cylinder member whereby to energize the latter; and control means operably coupled with said power source and with said electrical power service, for controlling said power source to selectively energize said motor means, said control means including sensing means operably coupled with said electrical power service for detecting the presence or absence of the delivery of electrical power to said building, said control means being operable to control said power source for energizing said motor means to allow shifting of said door to its said first position when said presence of electrical power is detected by said sensing means, said control means being further operable to control said power source for de-energizing said motor means to allow shifting of said door to its said second position when said absence of electrical power is detected by said sensing means.

3. The invention of claim 2, wherein:

said control means includes valve means operably coupled with said power input of said cylinder member of said sensing means, and under control of the latter for selectively controlling the return of said quantity of said medium from said cylinder member to said source thereof for de-energizing said cylinder member.

4. The invention of claim 3, wherein said force transmitting medium comprises a hydraulic fluid.

5. The invention of claim 3, wherein said pumping means comprises:

a pump having an output section thereof operably coupled with said power input of said cylinder member, and an input section thereof adapted to be coupled with said medium source, and an electrical motor operably coupled with said pump for driving the latter to pump said medium and adapted to be coupled with said electrical power service.

6. The invention of claim 5, wherein said control means further includes:

means for sensing the pressure of said medium produced by said pumping means and for coupling and uncoupling said electrical motor from said electrical power service whereby to selectively energize said pump when preselected levels of pressure of said medium have been sensed, said pressure sensing means having an input section operably coupled with said output section of said pump, and including switching means operably coupled with said electrical motor and with said electrical power service, said switching means being responsive to the pressure sensed at said pressure sensing means input to uncouple said electrical motor from said electrical power service when a first level of pressure associated with the energization of said motor means has been sensed, and to couple said electrical motor with said electrical power service when a second level of pressure associated with the de-energization of said motor means has been sensed.

7. Automatic door operating apparatus operable in accordance with the delivery of electricity from a source of electrical power, including:

biasing means operably connected with said door for urging the latter to shift from a first position to a second position thereof;

motor means having a shiftable output element connected with said door for overcoming the influence of said biasing means to shift said door from its said second position to its said first position, said motor means including a power input thereto adapted to receive a pressurized force transmitting medium for energizing the same to shift said door;

pumping means for delivering said medium under pressure to said motor means for energizing the latter, said pumping means including an output operably coupled with said motor means input, and being adapted to be coupled with a supply of said medium and with said electrical power source;

valve means operably coupled with said motor means input and being selectively actuatable for allowing escape of said medium delivered to said motor means whereby to de-energize said motor means;

means operably coupled with said motor means input for sensing the pressure of said medium delivered to the latter by said pumping means, said sensing means including switchable circuit means operably coupled between said pumping means and said electrical power source, said sensing means functioning to uncouple said electrical power source from said pumping means whereby to de-energize the latter when a preselected level of medium pressure is sensed by said sensing means; and means for detecting the delivery of electricity from said source of electrical power, said detecting means being operably coupled with valve means and functioning to selectively actuate the latter in accordance with said delivery of electricity for shifting of said door.

8. The invention of claim 7, wherein:

said valve means and said pumping means are operably coupled with said supply of said medium, said valve means having an open position and a closed position, said detection means being operable to actuate said valve means to said closed position thereof for preventing escape of said medium from said motor means whereby to maintain said motor means in its energized state with said door in said first position, when said delivery of said electricity is detected, said detection means being further operable to actuate said valve means to said open position thereof for placing said motor means input in medium communication with said medium supply, whereby to de-energize said motor means to allow said biasing means to shift said door to said second position.

9. The invention of claim 8, wherein there is further provided:

check valve means operably coupled between said motor means input and said pumping means output, for preventing the return of said medium from said motor means to said pumping means, and manually operable switch means operably coupled between said source of electrical power and said detection means, for allowing selective interruption of said delivery of said electricity to said detection means.

* * * * *